United States Patent
Jo et al.

(10) Patent No.: US 7,567,778 B2
(45) Date of Patent: Jul. 28, 2009

(54) APPARATUS AND METHOD FOR CONTROLLING SWITCH OF SATELLITE TRANSPONDER FOR MULTIBEAM COMMUNICATION

(75) Inventors: Jin-Ho Jo, Daejon (KR); Kyung-Soo Choi, Daejon (KR); Jong-Won Eun, Daejon (KR); Seong-Pal Lee, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 0 days.

(21) Appl. No.: 10/579,893

(22) PCT Filed: Nov. 18, 2004

(86) PCT No.: PCT/KR2004/002994

§ 371 (c)(1),
(2), (4) Date: Mar. 16, 2007

(87) PCT Pub. No.: WO2005/050871

PCT Pub. Date: Jun. 2, 2005

(65) Prior Publication Data

US 2007/0149119 A1   Jun. 28, 2007

(30) Foreign Application Priority Data

Nov. 19, 2003   (KR) ................ 10-2003-0082239

(51) Int. Cl.
*H04B 7/185* (2006.01)

(52) U.S. Cl. .............. 455/12.1; 455/427; 455/11.1; 455/13.3

(58) Field of Classification Search .......... 455/12.1, 455/13.1, 427, 428, 430, 418, 11.1, 13.3, 455/83, 98; 342/354, 356; 370/325
See application file for complete search history.

(56) References Cited

U.S. PATENT DOCUMENTS 4,004,098 A * 1/1977 Shimasaki ............. 370/325

(Continued)

FOREIGN PATENT DOCUMENTS

KR   1019940010570   5/1994
KR   1997-0078066   12/1997

OTHER PUBLICATIONS

Assal et al.; "Satellite switching center for SS-TDMA communications"; COMSAT Technical Review vol. 12; No. 1; Spring 1982; pp. 29-67.

(Continued)

*Primary Examiner*—Tan Trinh
(74) *Attorney, Agent, or Firm*—Lowe Hauptman Ham & Berner, LLP

(57) ABSTRACT

Provided are an apparatus for controlling a switch of a satellite transponder for multibeam communication, and a method thereof. The apparatus and method can increase output efficiency of communicated satellite electric wave signals and reuse frequencies in one-to-one earth station communication or a one-to-multi earth station communication. The apparatus includes: an earth control station interfacing block for receiving and processing commands from an earth control station, collecting operation states of the switch controlling apparatus and reporting them to the earth control station; a reference frequency generating block for generating a reference clock needed to operate the switch controlling apparatus and generating a reference frequency based on the reference clock; and a switch controlling block for reading contents of a memory storing a switching sequence periodically, detecting and correcting errors of the contents to generate a switch control signal, and transmitting the signal to a radio frequency switch.

6 Claims, 3 Drawing Sheets

U.S. PATENT DOCUMENTS

| | | | |
|---|---|---|---|
| 4,599,680 A * | 7/1986 | Gibson et al. | 361/684 |
| 4,926,422 A | 5/1990 | Alaria et al. | |
| 5,790,070 A * | 8/1998 | Natarajan et al. | 342/354 |
| 5,825,325 A | 10/1998 | O'Donovan et al. | |
| 5,969,674 A * | 10/1999 | von der Embse et al. | 342/357.16 |
| 6,014,372 A | 1/2000 | Kent et al. | |
| 6,301,476 B1 * | 10/2001 | Monte et al. | 455/427 |
| 2002/0072389 A1 | 6/2002 | Ward et al. | |

OTHER PUBLICATIONS

International Search Report dated Feb. 7, 2005 for PCT/KR2004/002994.

Foreign patent document for Korean app. 10-2003-0082239.

* cited by examiner

APPARATUS AND METHOD FOR CONTROLLING SWITCH OF SATELLITE TRANSPONDER FOR MULTIBEAM COMMUNICATION

CROSS REFERENCE TO RELATED APPLICATION

This application is the National Phase application of International Application No. PCT/KR2004/002994, filed Nov. 18, 2004, which designates the United States and was published in English. This application, in its entirety, is incorporated herein by reference.

1. Technical Field

The present invention relates to an apparatus for controlling a switch of a satellite transponder for multibeam communication and a method thereof; and, more particularly, to an apparatus for controlling a switch of a satellite transponder for multibeam communication that can control an On Board Switch (OBS) of a communication satellite transponder which performs multibeam switching, and a method thereof.

2. Background Art

Generally, a communication satellite transponder which is mounted on a communication satellite in a geostationary orbit receives an uplink signal from an earth station, converts the uplink signal into a downlink signal through signal conversion and amplification, and transmits the downlink signal back to the earth station. This function is called signal transponding.

The communication satellite transponder is called a bent pipe-type transponder and it simply converts the frequency of the uplink signal inputted to the satellite, and amplifies and transmits the resultant signal.

Since the bent pipe-transponder has a simple structure, it is widely used for communication satellite transponding services. However, since a communication satellite signal wave is transmitted over a wide area, there is a problem that the satellite wave output and frequency resources are used wastefully on the part of the earth station which performs one-to-one communication.

A prior art related to the present invention discloses "Time-space-time switching network adopted in satellite" in Korean Patent Laid-Open No. 1994-001057 which is published on May 26, 1994.

The technology of the above prior art provides a T-S-T type switching circuit with improved reliability of the entire system by dividing a space switch having an N×N switch structure in a conventional T-S-T type switching network, which is composed of a time switch of the receiving part-baseband space switch-time switch of the transmitting part in the On-board Baseband Processor (OBP) of a satellite communication system into, N/m×N/m' switches. If there is only one space switch, trouble in the space switch leads to a serious trouble of the entire system. However, since the switch is divided into a plurality of space switches, although some of the space switches are out of order, traffics can be processed with the other space switches. Therefore, the performance reliability can be increased.

However, the disclosed patent suggests only a method of switching signal data transmitted from the satellite and increases the system reliability by switching data contents by demodulating signal transmitted to a satellite and converting the signal into data. In other words, it receives uplink signals of the earth station transmitted from a plurality of beam areas in the satellite and transmits downlink signals into corresponding beam areas by switching electric wave signals in real-time. In consequences, it does not provide a function of transmitting the electric wave signals which should be transmitted from a beam area into other areas in the satellite by using a switching function. Therefore, it cannot increase the electric power efficiency of the transponder and reuse frequencies.

DISCLOSURE OF INVENTION

It is, therefore, an object of the present invention to provide an apparatus for controlling a switch of a satellite transponder for multibeam communication, the apparatus which can increase the output efficiency of communicated satellite electric wave signals and reuse frequencies in one-to-one earth station communication or a one-to-multi earth station communication, and a method thereof.

In accordance with one aspect of the present invention, there is provided an apparatus for controlling a switch of a satellite transponder for multibeam communication, which will be referred to as a switch controlling apparatus herein, which includes: an earth control station interfacing block for receiving and processing commands from an earth control station, collecting operation states of the switch controlling apparatus and reporting the operation states to the earth control station; a reference frequency generating block for generating a reference clock needed to operate the switch controlling apparatus and generating a reference frequency needed for the operation of the switch controlling apparatus based on the reference clock; and a switch controlling block for reading contents of a memory that stores a switching sequence periodically, detecting and correcting an error of the contents to generate a switch control signal, and transmitting the switch control signal to a radio frequency (RF) switch.

In accordance with one aspect of the present invention, there is provided a method for controlling a switch which is applied to an apparatus for controlling a switch of a satellite transponder, the method which includes the steps of: a) receiving and processing commands from an earth control station, collecting operation states of the switch controlling apparatus and reporting the operation states to the earth control station; b) generating a reference clock needed to operate the switch controlling apparatus and generating a reference frequency needed for the operation of the switch controlling apparatus based on the reference clock; and c) reading contents of a memory that stores a switching sequence periodically, detecting and correcting an error of the contents to generate a switch control signal, and transmitting the switch control signal to an RF switch.

The present invention provides a communication satellite transponder that performs multibeam switching function with a concept of an On-Board Switch (OBS) satellite. Differently from a conventional bent pipe-type satellite, the OBS satellite of the present invention divides communication coverage into several areas, e.g., an area A, an area B and an area C, and relays uplink and downlink signals from the areas to the satellite by performing beam switching in the satellite. Since satellite signals are collected and transmitted according to each area differently from the conventional method where satellite signals are transmitted to the entire coverage areas, the output of satellite signals received in each area is higher than that of the signals in the conventional bent pipe-type transponder. In addition, frequencies can be reused in each area due to the use of a multibeam.

Accordingly, the present invention provides a switch controlling apparatus which controls an RF switch for multibeam switching effectively. Its dual memory structure increases system reliability and the switch controlling apparatus has an earth station interface for monitoring and controlling operation state of the switch controlling apparatus in the earth station.

BRIEF DESCRIPTION OF DRAWINGS

The above and other objects and features of the present invention will become apparent from the following description of the preferred embodiments given in conjunction with the accompanying drawings, in which.

BEST MODE FOR CARRYING OUT THE INVENTION

Other objects and aspects of the invention will become apparent from the following description of the embodiments with reference to the accompanying drawings, which is set forth hereinafter.

Figure 1:
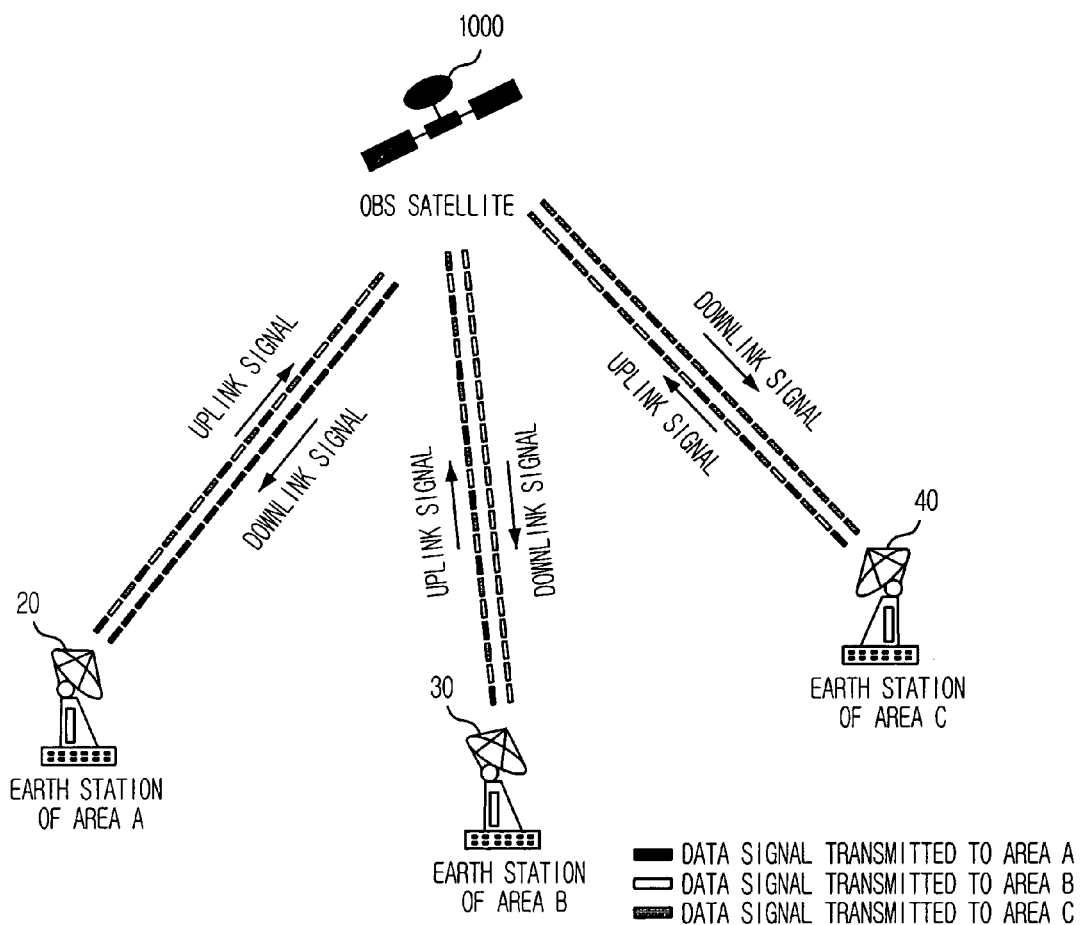
FIG. 1 is an exemplary diagram illustrating a satellite communication system for multibeam communication to which the present invention is applied.

FIG. 1 is an exemplary diagram illustrating a satellite communication system for multibeam communication to which the present invention is applied.

As shown, an On-Board Switch (OBS) satellite 1000 divides satellite coverage where the electric waves form the satellite can be received into a plurality of areas. For example, an earth station 20 of an area A denotes one of earth stations that is located in a beam area A of the OBS satellite 1000. An earth station B 30 of an area B and an earth station C 30 of an area C denote earth stations that are located in the beam areas B and C of the OBS satellite 1000, respectively.

The earth station 20 of the area A transmits uplink signals to the OBS satellite 1000 by performing time-division on signals (A→B and A→C) to be transmitted to an earth station in another area along with a signal (A→A) to be transmitted to another earth station in the same area A.

The earth station 30 of the area B transmits uplink signals to the OBS satellite 1000 by performing time-division on signals (B→A and B→C) to be transmitted to an earth station in another area along with a signal (B→B) to be transmitted to another earth station in the same area B.

The earth station 40 of the area C transmits uplink signals to the OBS satellite 1000 by performing time-division on signals (C→A and C→B) to be transmitted to an earth station in another area along with a signal (C→C) to be transmitted to another earth station in the same area C.

The OBS satellite 1000 performs time-division switching on RF signals transmitted from the earth stations 20, 30 and 40 of the areas and classifies signals (A→A, B→A and C→A) to be transmitted to the area A as signals for the area A; signals (A→B, B→B and C→B) to be transmitted to the area B as signals for the area B; and signals (A→C, B→C and C→C) to be transmitted to the area C as signals for the area C.

The classified signals are transmitted as downlink signals for each area through a satellite antenna directed to each area. To sum up, the downlink signals for the area A are obtained by performing switching on the signals (black signals) that should be transmitted to the area A in the satellite and transmitted to the area A. The downlink signals for the area B are obtained by performing switching on the signals (white signals) that should be transmitted to the area B in the satellite and transmitted to the area B. The downlink signals for the area C are obtained by performing switching on the signals (signals expressed in block and white, i.e., black and white signals) that should be transmitted to the area C in the satellite and transmitted to the area C.

Figure 2:
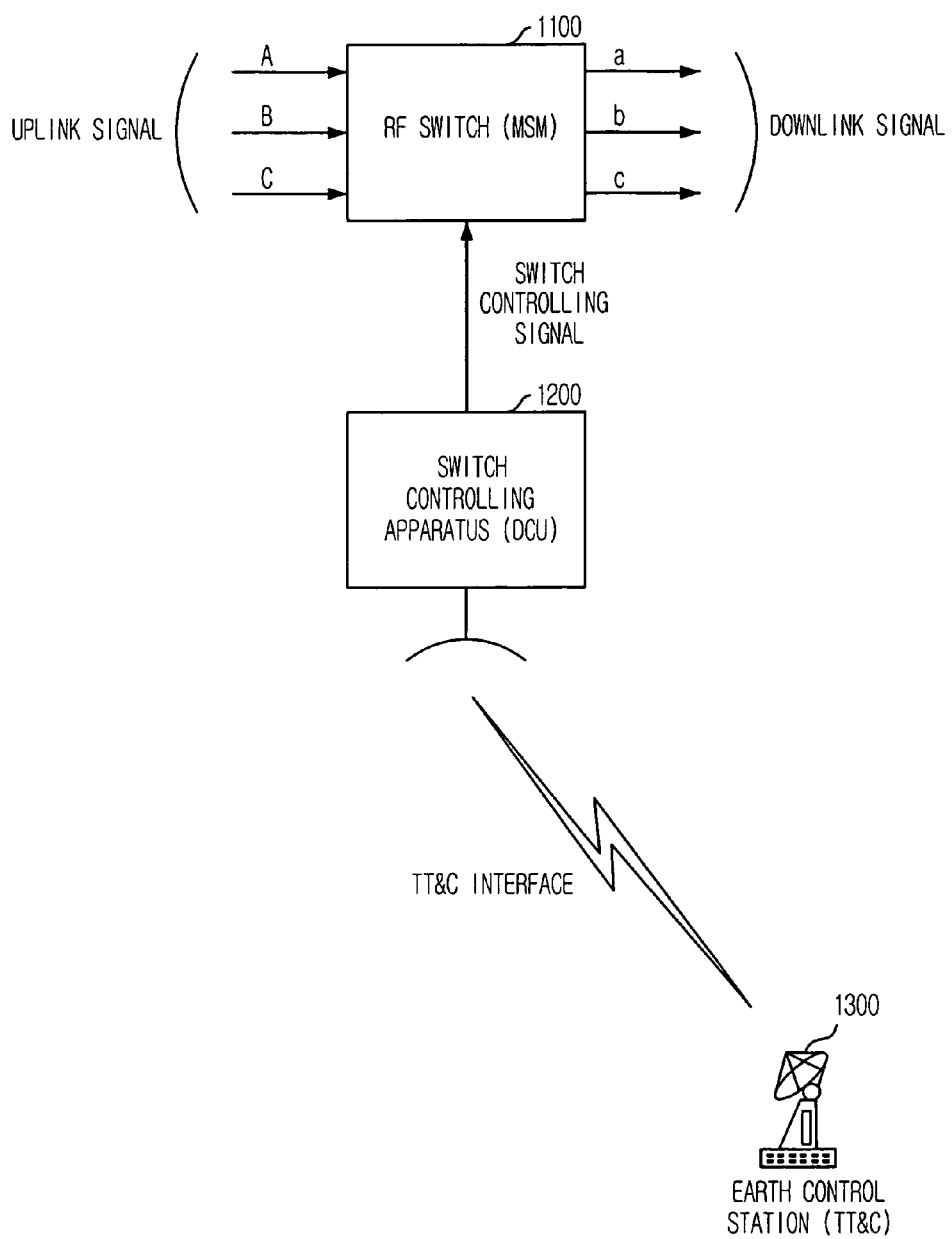
FIG. 2 is a diagram describing a radio frequency (RF) switch, which is a Microwave Switch Matrix (MSM), and a switch controlling apparatus, which is a Digital Control Unit (DCU), mounted on an On-Board Switch (OBS) to which the present invention is applied.

FIG. 2 is a diagram describing a radio frequency (RF) switch, which is a Microwave Switch Matrix (MSM), and a switch controller, which is a Digital Control Unit (DCU), mounted on an On-Board Switch (OBS) switch to which the present invention is applied.

As shown, the MSM 1100 performs switching on uplink signals A, B and C that are transmitted upwardly from an earth station, converts them into downlink signals a, b and c, and transmits them to the earth stations of the areas. The operation of the MSM 1100 is controlled by the DCU 1200, which is a switch controlling apparatus. The DCU 1200 stores a switching sequence which is needed to control the MSM 1100 in a memory and controls the MSM 1100 by reading the sequence sequentially.

The DCU 1200 is interfaced with an earth control station 1300. It communicates with the earth control station 1300 through a Tracking, Telemetry & Command (TT&C) channel. Through the interface, the earth control station 1300 can monitor the operation of the DCU 1200 mounted on the satellite and adjust various DCU operation parameters required for operation. Also, the DCU 1200 performs a function of updating the switching sequence stored in a switching memory 1221 of the DCU 1200 through the interface with the earth control station 1300.

Figure 3:
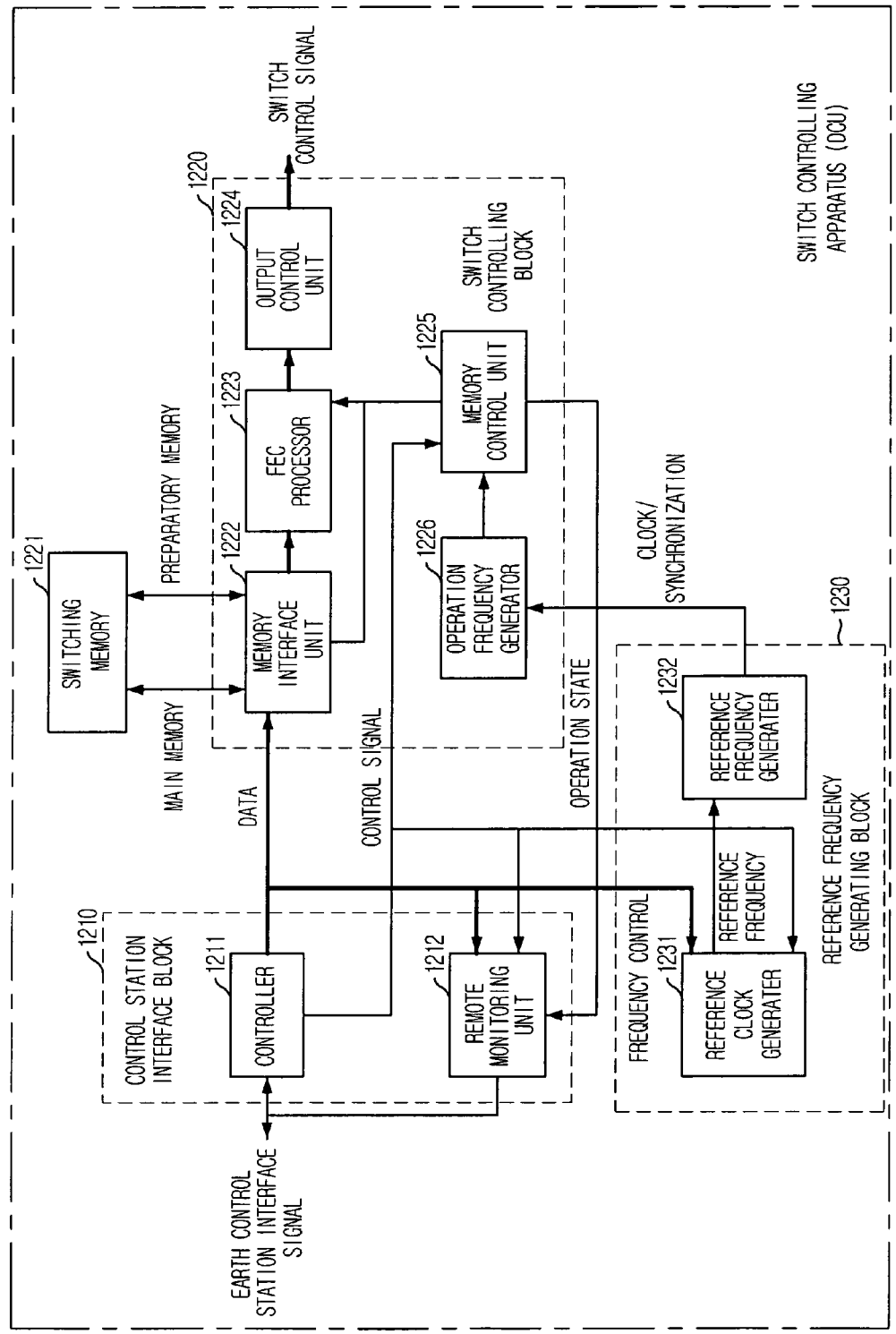
FIG. 3 is a block diagram describing a switch controlling apparatus of a satellite transponder for multibeam communication in accordance with an embodiment of the present invention.

FIG. 3 is a block diagram describing the DCU 1200 of a satellite transponder for multibeam communication in accordance with an embodiment of the present invention.

As shown, the DCU 1200 of the satellite transponder for multibeam communication, which is suggested in the present invention, comprises a control station interface block 1210, a switch controlling block 1220, and a reference frequency generating block 1230.

The control station interface block 1210 receives and processes commands from the earth control station 1300, collects data on the operation state of the DCU 1200, and reports them to the earth control station 1300. The switch controlling block 1220 reads the contents of the memory that stores the switching sequence periodically, detects and corrects an error in the contents to generate a switch control signal, and transmits the switch control signal to the RF switch 1100. The reference frequency generating block 1230 generates a reference clock which is required for the operation of the DCU 1200 and generates a reference frequency required for the operation of the DCU 1200.

The switch controlling apparatus 1200 of a satellite transponder for multibeam communication having the above structure, which is suggested in the present invention, is operated as follows.

The control station interface block 1210, which is a module in charge of interface between the DCU 1200 and the earth control station 1300, includes a controller 1211 and a remote monitoring unit 1212.

The controller 1211 receives DCU control commands transmitted upwardly from the earth control station 1300, analyzes the commands and transmits them to corresponding parts of the DCU, i.e., switch controlling apparatus 1200.

The remote monitoring unit 1212 collects operation states of modules in the DCU 1200 periodically and transmits them to the earth control station 1300 so that the operation state of the DCU 1200 can be monitored in the earth control station 1300.

The reference frequency generating block 1230 generates a clock and a synchronization signal required for the operation of the DCU 1200, and it includes a reference clock generator 1231 and a reference frequency generator 1232. The reference clock generator 1231 includes a voltage control crystal oscillator (VCXO) that generates highly stable clocks and it has a function of receiving frequency control data from the earth control station to correct phase difference from the clocks of the earth station. The reference frequency generator 1232 generates various synchronization signals required for the operation of the DCU 1200 by using the clocks generated in the reference clock generator 1231. The synchronization signals are used to operate the DCU 1200.

The switch controlling block 1220 is a module in charge of switch controlling and it includes a switching memory 1221 and a memory interface unit 1222. The switching memory 1221 is composed of two memories: A main memory and a preparatory memory. Even if the main memory is out of order, it can continue to be operated with the preparatory memory. The memory interface unit 1222 reads switching data stored in the switching memory 1221 and writes updated switching data transmitted from the earth station in the switching memory 1221. A forward error correction (FEC) processor 1223 prevents an error in a switching signal transmitted to the RF switch 1100, i.e., MSM, by correcting a memory content error generated due to radiation in the space environment. The FEC processor 1223 corrects a one-bit error among the memory data which are read in the switching memory 1221. For errors more than two bits, it informs the presence of the errors to the earth station. Also, an output control 1224 transmits switching signals to the MSM 1100 and an operation frequency generator 1226 generates an operation time needed to operate the switch controlling block 1220 by using the clock/synchronization signals generated in a reference frequency generating block 1230. A memory control unit 1225 controls the operation of the switching memory 1221 and the memory interface unit 1222 and synchronizes data communication between them.

As described above, the RF switch controlling apparatus that is mounted on the OBS satellite for multibeam communication and performs beam switching on the uplink and downlink signals between the earth station and the satellite is new technology that can solve the problems of the conventional communication satellite transponder, that is, a problem of low power efficiency of a satellite transponder and a problem of reusing frequencies, at once. Since it transmits signals for each communication area collectively through real-time beam switching with a limited power of a transponder, the power efficiency in the satellite transponder is excellent. In addition, since frequencies can be reused between isolated beams, the problem of insufficient frequency resources can be solved.

The method of the present invention, which is described above, can be embodied as a program and stored in a computer-readable recording medium such as CD-ROM, RAM, ROM, floppy disks, hard disks, magneto-optical disks and the like. Since the process can be easily executed by those of ordinary skill in the art of the present invention, further description on it will be omitted herein.

As described above, the dual memory structure suggested in the present invention can minimize the probability of system discontinuance caused by trouble in a memory during operation. Also, the switch controlling apparatus can control an RF switch stably by including the FEC function for correcting data errors that can be generated by radiation during the operation in the space environment. It also includes an earth station interface for monitoring and controlling the operation state of the DCU in the earth station.

Differently from the conventional communication satellite that relays signals by simply converting uplink signals into downlink signals through frequency conversion and amplification, the OBS satellite of the present invention performs multibeam communication converts and amplifies the frequency of the uplink signals from the earth station and, further, it performs beam switching on the signals transmitted from the earth stations and transmits them downwardly to corresponding areas. This way, it can use satellite outputs efficiently and reuse frequencies by minimizing interference between the switched beams.

The present application contains subject matter related to Korean patent application No. 2003-0082239, filed in the Korean Intellectual Property Office on Nov. 19, 2003, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A switching controlling apparatus for controlling a radio frequency (RF) switch of a satellite transponder for multibeam communication, said apparatus comprising:
    an earth control station interfacing unit comprising:
    a controller for receiving control commands transmitted over an uplink from an earth control station, analyzing the commands and transmitting the commands to corresponding parts of the switch controlling apparatus; and
    a monitoring unit for periodically collecting operation states of modules in the switch controlling apparatus and reporting the operation states to the earth control station so that the operation states of the switch controlling apparatus can be monitored in the earth control station;
    a reference frequency generating unit for generating a reference clock needed to operate the switch controlling apparatus and for generating a reference frequency needed for the operation of the switch controlling apparatus based on the reference clock; and
    a switch controlling unit for reading contents of a memory that stores a switching sequence periodically, detecting and correcting an error of the contents to generate a switch control signal, and transmitting the switch control signal to said RF switch.

2. The switch controlling apparatus as recited in claim 1, wherein the reference frequency generating unit comprises:
    a reference clock generator which is formed of a voltage control crystal oscillator (VCXO) for generating highly stable clocks and is arranged, upon receipt of frequency control data from the earth control station, to correct a phase difference from clocks of the earth control station; and
    a reference frequency generator for generating various synchronization signals needed to operate the switch controlling apparatus based on the clocks generated in the reference clock generator.

3. A switch controlling apparatus for controlling a radio frequency (RF) switch of a satellite transponder for multibeam communication, said apparatus comprising:
    an earth control station interfacing unit for receiving and processing commands from an earth control station, collecting operation states of the switch controlling apparatus and reporting the operation states to the earth control station;

a reference frequency generating unit for generating a reference clock needed to operate the switch controlling apparatus and for generating a reference frequency needed for the operation of the switch controlling apparatus based on the reference clock; and a switch controlling unit for reading contents of a memory that stores a switching sequence periodically, detecting and correcting an error of the contents to generate a switch control signal, and transmitting the switch control signal to said RF switch;

wherein the reference frequency generating unit comprises;

a reference clock generator which is formed of a voltage control crystal oscillator (VCXO) for generating highly stable clocks and is arranged, upon receipt of frequency control data from the earth control station, to correct a phase difference from clocks of the earth control station; and a reference frequency generator for generating various synchronization signals needed to operate the switch controlling apparatus based on the clocks generated in the reference clock generator; and wherein the switch controlling unit comprises:

a memory interface unit for reading switching data stored in a duplexer and writing updated switching data transmitted over an uplink from the earth control station in the duplexer;

the duplexer for performing duplexing to operate a preparatory memory when a main memory is out of order during signal transmission/reception with the memory interface unit;

a switching signal processor for preventing an error in a switching signal to be transmitted to the RF switch;

an output controller for transmitting the switching signal to the RF switch;

an operation frequency generator for generating an operation time needed for the operation of the switch controlling apparatus based on the clock and synchronization signals generated in the reference frequency generating unit; and a memory controller for synchronizing data communication with the duplexer by controlling the operation of the memory interface unit.

4. A method of controlling a radio frequency (RF) switch of a satellite transponder, using a switch controlling apparatus, the method comprising the steps in which:

a controller of an earth control station interfacing unit of the switch controlling apparatus receives control commands transmitted over an uplink from an earth control station, analyzes the commands and transmits the commands to corresponding parts of the switch controlling apparatus; a monitoring unit of the earth control station interfacing unit of the switch controlling apparatus periodically collects operation states of modules in the switch controlling apparatus and reports the operation states to the earth control station so that the operation states of the switch controlling apparatus can be monitored in the earth control station;

a reference frequency generating unit of the switch controlling apparatus generates a reference clock needed to operate the switch controlling apparatus and a reference frequency needed for the operation of the switch controlling apparatus based on the reference clock; and a switch controlling unit of the switch controlling apparatus reads contents of a memory that stores a switching sequence periodically, detects and corrects an error of the contents to generate a switch control signal, and transmits the switch control signal to said RF switch.

5. The method of claim 4, wherein, in the reference frequency generating unit, a reference clock generator generates, by a voltage control crystal oscillator (VCXO), highly stable clocks and corrects, upon receipt of frequency control data from the earth control station, a phase difference from clocks of the earth control station; and a reference frequency generator generates various synchronization signals needed to operate the switch controlling apparatus based on the clocks generated in the reference clock generator.

6. The method of claim 5, wherein, in the switch controlling unit, a memory interface unit reads switching data stored in a duplexer and writes updated switching data transmitted over the uplink from the earth control station in the duplexer;

the duplexer performs duplexing to operate a preparatory memory when a main memory is out of order during signal transmission/reception with the memory interface unit;

a switching signal processor operates to prevent an error in a switching signal to be transmitted to the RF switch;

an output controller transmits the switching signal to the RF switch;

an operation frequency generator generates an operation time needed for the operation of the switch controlling apparatus based on the clock and synchronization signals generated in the reference frequency generating unit; and a memory controller synchronizes data communication with the duplexer by controlling the operation of the memory interface unit.

* * * * *